PULSE-COUNTING-TYPE LINEAR FREQUENCY DISCRIMINATOR

Filed March 13, 1968 2 Sheets-Sheet 1

INVENTORS:
Ezio Cottatellucci
Francesco Carena
BY
Karl F. Ross
Attorney

PULSE-COUNTING-TYPE LINEAR FREQUENCY DISCRIMINATOR

Filed March 13, 1968 2 Sheets-Sheet 2

Ezio Cottatellucci
Francesco Carena
INVENTORS.

BY

Karl F. Ross
Attorney

United States Patent Office 3,502,995
Patented Mar. 24, 1970

3,502,995

PULSE-COUNTING-TYPE LINEAR FREQUENCY DISCRIMINATOR

Ezio Cottatellucci and Francesco Carena, Milan, Italy, assignors to Società Italiana Telecomunicazioni Siemens S.p.A., Milan, Italy, a corporation of Italy Filed Mar. 13, 1968, Ser. No. 714,400
Claims priority, application Italy, Mar. 29, 1967, 14,270/67
Int. Cl. H03d 3/04
U.S. Cl. 329—126 7 Claims

ABSTRACT OF THE DISCLOSURE

A frequency-modulated carrier wave is differentiated to yield a sharp counting pulse at the beginning of each cycle, this pulse being applied to a delay line to start a time interval $T_0$ satisfying the relationship $$nT_{max} \leqq T_0 \leqq (n+1)T_{min}$$

where $T_{max}=1/f_{min}$ is the length of a cycle at the minimum frequency $f_{min}$, $T_{min}=1/f_{max}$ is the length of a cycle at the maximum frequency $f_{max}$, and $n$ is an integer equal to or just below the value $1/(k-1)$, with $k=f_{max}/f_{min}$; a flip-flop responsive to the counting pulses and to countervailing pulses from the delay line generates a train of rectangular pulses of a duration $T_0-nT$ or $(n+1)T-T_0$, $T=1/f$ being the length of a cycle at the actual carrier frequency $f$, whereupon these rectangular pulses are integrated to yield a signal voltage proportional to positive or negative increments in carrier frequency within the range $\Delta f=f_{max}-f_{min}$.

Our present invention relates to a frequency discriminator adapted to be used for the detection of frequency-modulated radio signals, e.g. in television systems or in conjunction with radio links for the transmission of telephone messages over a multiplicity of high-frequency channels. Such multichannel systems may operate with intermediate-frequency carriers of approximately 70 to 100 megacycles, the modulation of the carrier frequency extending over a band of about 10 to 30 megacycles.

Conventional frequency discriminators utilize frequency-selective networks whose output voltages vary progressively with frequency; these discriminators, however, generally do not exhibit perfect linearity over the entire modulation band. There has, accordingly, already been proposed a different system, known as the Vecchiacchi discriminator, which generates a rectangular signal pulse of fixed duration for each cycle of the incoming carrier wave and integrates these pulses over a certain period to produce an output signal proportional to frequency. Although this system performs perfectly linearly, its sensitivity (i.e. the slope of its amplitude/frequency characteristic) is restricted by the fact that the width of these signal pulses must not exceed the length of the shortest cycle, $T_{min}$, which of course is the reciprocal of the highest carrier frequency $f_{max}$. Moreover, other factors being equal, the voltage level $V_0$ of the rectangular signal pulse varies inversely with the limiting frequency $f_{max}$, owing to the presence of irreducible stray capacitances effective at these high frequencies. Thus, with the integrated output signal having an amplitude A equivalent to $V_0T_0f$, where $T_0$ is the pulse width and $f$ is the instantaneous carrier frequency, the sensitivity is given by the relationship $$dA/df=T_0V_0 \qquad (1)$$

and, since both $T_0$ and $V_0$ are limited in the aforedescribed manner by $f_{max}$, may be considered inversely proportional to the square of the highest carrier frequency.

The general object of our present invention is to provide an improved discriminator of the type just described which, while retaining its linear characteristic throughout the operating frequency band, is of greatly increased sensitivity, particularly if the frequency ratio $$f_{max}/f_{min} \equiv k$$

is smaller than 2.

This object is realized, pursuant to our present invention, by the provision of means for generating a train of signal pulses whose width T varies progressively over the frequency band between $f_{min}$ and $f_{max}$. A sharp counting pulse, generated once per cycle with the aid of suitable circuit means such as a differentiation network, actuates a timing means—preferably a delay line—for measuring a time interval $T_0$ which, however, no longer represents the width of a rectangular pulse (as in the aforedescribed Vecchiacchi discriminator) but extends over at least one full cycle T of carrier frequency $f$ so that the end of this interval invariably falls between two successive counting pulses subsequently generated or coincides with one of them. Thus, the time interval $T_0$ satisfies the relationship $$\frac{n}{f_{min}} \leqq T_0 \leqq \frac{n+1}{f_{max}} \qquad (2)$$

which can also be expressed as $$nT_{max} \leqq T_0 \leqq n+1(T_{min}) \qquad (2')$$

$n$ being an integer and representing the number of cycles spanned by the interval $T_0$. Next, a rectangular signal pulse is generated to bridge a variable period between the end of the interval $T_0$ and either the immediately preceding or the immediately following counting pulse, the duration P of this signal pulse being thus given either by $$P=T_0-\frac{n}{f} \qquad (3)$$

or by $$P=\frac{n+1}{f}-T_0 \qquad (3a)$$

The integrated value of a succesion of such signal pulses, expressed as the average voltage $V=PV_0f$, is thus given either by $$V=V_0(T_0f-n) \qquad (4)$$

or by $$V=V_0(n+1-T_0f) \qquad (4a)$$

The corresponding slope $s$ is, therefore, $$s \equiv dV/df=V_0T_0 \qquad (5)$$

or $$s \equiv dV/df=-V_0T_0 \qquad (5a)$$

The last two equations are similar to Equation 1, except that, pursuant to Equation 2, $T_0$ can now be made equal to, or only slightly less than, $$\frac{n+1}{f_{max}}$$

in lieu of $$\frac{1}{f_{max}}$$

as in the previous case.

If, in Equation 2, the limiting condition expressed by the equality signs are assumed, we find that $$n=\frac{f_{min}}{f_{max}-f_{min}}=\frac{1}{k-1} \qquad (6)$$

whence $$T_0=\frac{1}{f_{max}-f_{min}}\equiv\frac{1}{\Delta f} \qquad (7)$$

This relationship holds true, of course, only if the ratio $1/k-1$ happens to be a whole number; otherwise, i.e. if this ratio is an improper fraction, $n$ is advantageously the nearest integer smaller than this fraction in order to realize the greatest possible slope $dA/df$.

The invention will be described in greater detail hereinafter with reference to the accompanying drawing in which.

Figure 1:
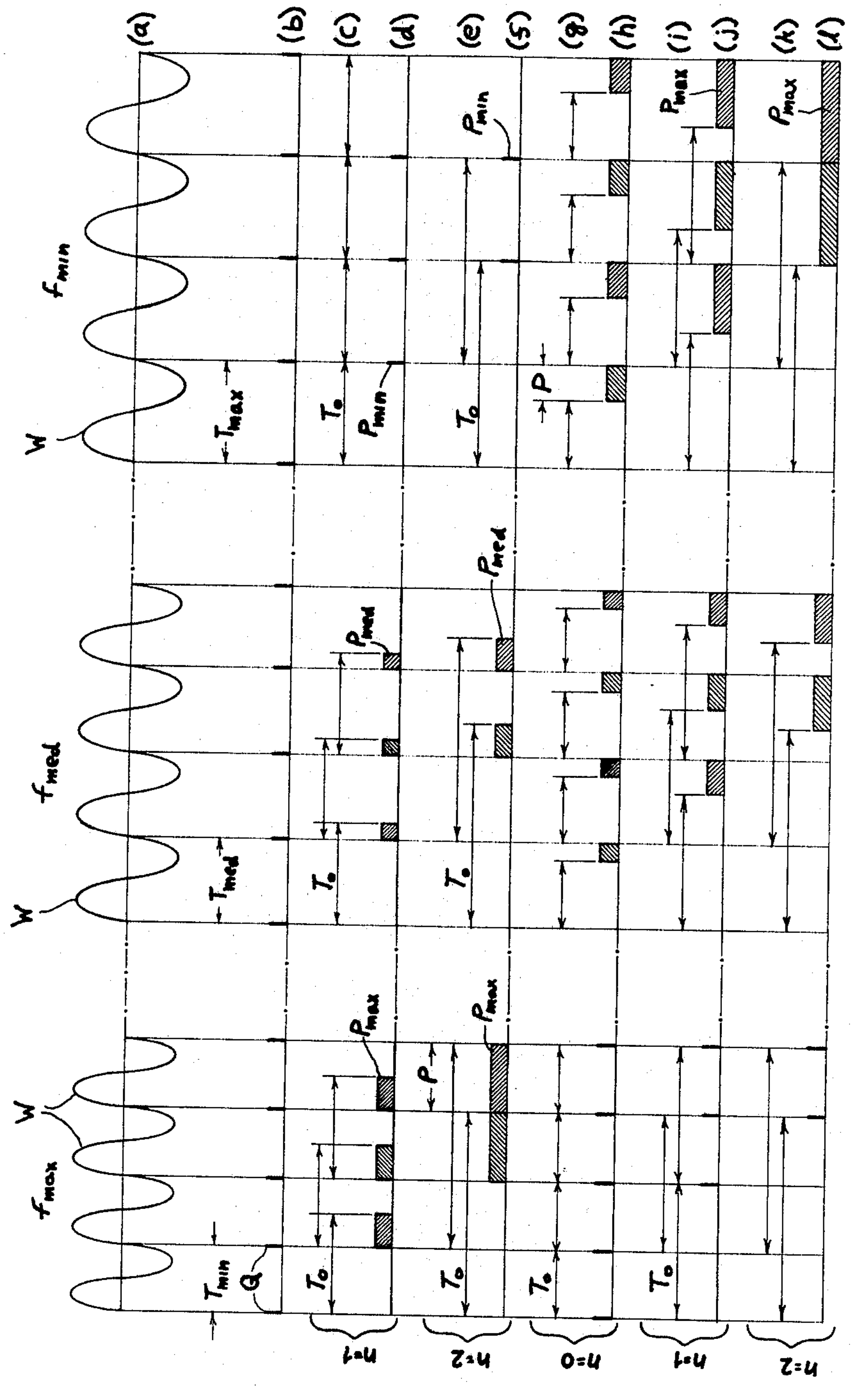
FIG. 1 is a set of graphs serving to explain the operation of our improved discriminator.

In FIG. 1, graph (*a*) represents an I.-F. carrier wave W whose frequency is variable between an upper limit $f_{max}$ and a lower limit $f_{min}$, an intermediate frequency level $f_{med}$ having also been illustrated. In a typical multichannel telephone system, using 960 channels, the bandwidth $\Delta f=f_{max}-f_{min}$ may be 12 mc., with $f_{max}=75$ mc.; a radio link operating in a higher frequency band, using 2700 channels, may have an intermediate frequency ranging between $f_{min}=85$ mc. and $f_{max}=115$ mc.

Graph (*b*) shows a train of counting pulses Q generated whenever the wave W goes through zero; although, in principle, such a pulse could be produced also after every half-cycle of wave W, this would effectively double the operating frequency and would commensurately reduce the sensitivity of the system for the reasons explained above in conjunction with Equations 5 and 5*a*. The spacing of pulses Q varies, of course, with the cycle length and therefore inversely with the frequency of the carrier wave.

As shown in graph (*c*), a time interval $T_0$ is measured from the occurrence of each counting pulse Q, the length of this interval $T_0$ being chosen just equal to the maximum cycle length $T_{max}$ so that its end occurs a variable period P after the generation of a counting pulse Q immediately following the one which marks the start of that interval. This period is occupied by a signal pulse shown in graph (*d*) at $P_{max}$ for frequency $f_{max}$, $P_{med}$ for frequency $f_{med}$ and $P_{min}$ for frequency $f_{min}$, the width of this latter pulse being zero. Graphs (*c*) and (*d*) represent the situation where $$n=1\neq\frac{1}{k-1}$$

the maximum pulse width $P_{max}$ being thus less than the minimum cycle length $T_{min}$.

The particular frequency relationship illustrated in FIG. 1 represents the ratio $k=3:2$ whence, according to Equation 6, the optimum value for $n$ equals 2. This mode of operation is represented in graphs (*e*) and (*f*) which show the pulse width P ranging between a maximum value $P_{max}=T_{min}$ and a minimum value $P_{min}=0$, this variation in pulse width representing the greatest available spread.

Graphs (*g*) through (*l*) of FIG. 1, represent the alternate technique according to this invention whereby the pulse P is measured from the end of the interval $T_0$ to the next-following counting pulse Q; this pulse width, accordingly, is a minimum (e.g. zero) for the highest frequency $f_{max}$ and a maximum for the lowest frequency $f_{min}$. Graphs (*g*) and (*h*) represent the condition $n=0$; while the pulse width here also changes progressively with frequency, the maximum width $P_{max}$ can never reach the greatest permissible value $T_{max}$. Graphs (*i*) and (*j*) show the case $n=1$, with $P_{max}$ still falling short of $T_{max}$ while being equal to $T_{min}$, which represents a substantial improvement over the situation of graphs (*g*) and (*h*). Graphs (*k*) and (*l*), finally, apply to the relationship $n=2$ which, again, leads to an optimum pulse-width range extending from zero to the maximum available period, here $T_{max}$.

Although the pulses $P_{max}$ in graph (*l*) are wider than those in graph (*f*), the latter occur more frequently within a unit of time since they are associated with the upper limiting frequency $f_{max}$ rather than with the lower limiting frequency $f_{min}$; this explains the fact that, except for the change in sign, the sensitivity of both systems is the same as is apparent from Equations 5 and 5*a*.

Figures 2, 3:
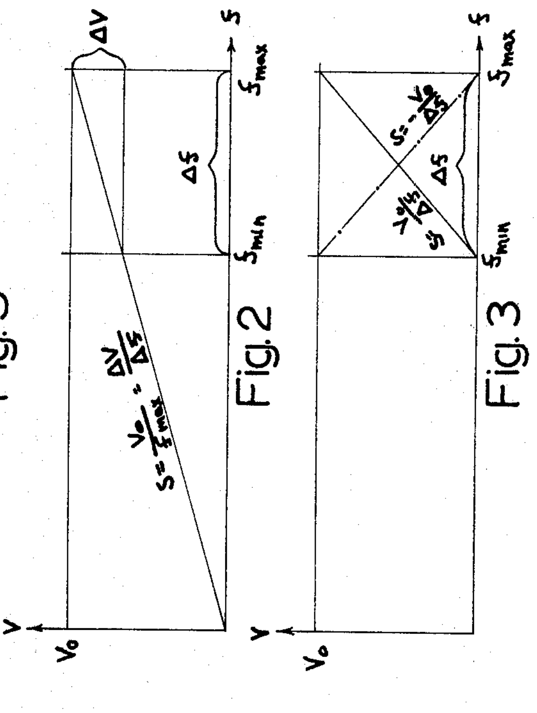
FIGS. 2 and 3 are graphs showing the voltage/frequency characteristic of a discriminator of the Vecchiacchi type and of our present discriminator, respectively.

In FIG. 2 we have shown the output voltage V of a Vecchiacchi discriminator operating with the maximum permissible pulse width equal to $$T_{min}=\frac{1}{f_{max}}$$

these pulses following one another substantially without interruption at the upper limit of the frequency range so that $V_{max}=V_0$; the slope $s=dV/df$ is thus equal to $V_0/f_{max}$ and can also be expressed by the ratio $\Delta V/\Delta f$, the voltage range $\Delta V$ being thus equal to $$\frac{V_0\Delta f}{f_{max}}$$

In contradistinction thereto, the discriminator according to our invention attains the output voltage $V=V_0$ either at $f=f_{max}$, this being the case of graph 1(*f*), or at $f=f_{min}$, as per graph 1(*l*). The corresponding slope is therefore given by $s\equiv V_0/\Delta f$ in the first case and by $s=-V_0/\Delta f$ in the second case.

Figure 4:
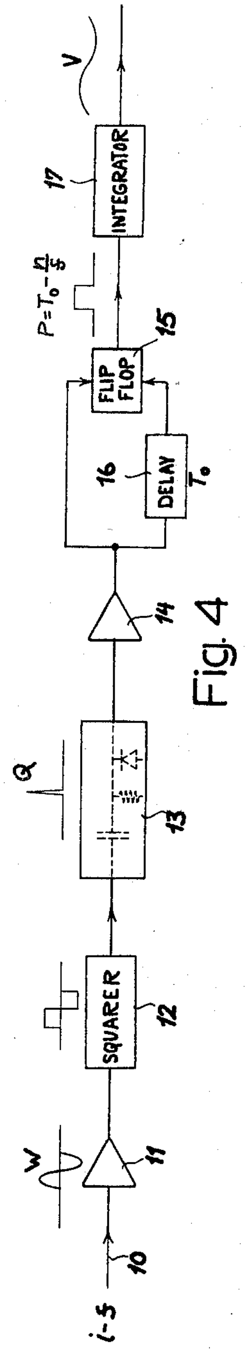
FIG. 4 is a block diagram of a frequency discriminator according to the invention.

The discriminator shown in FIG. 4 comprises an input line 10 receiving the intermediate-frequency carrier wave W of frequency $f$; an amplifier 11 applies this wave to a shaping circuit or squarer 12 converting it into a train of rectangular pulses. A differentiation circuit 13 derives from the output of wave shaper 12 a train of counting pulses Q which, after passage through a further amplifier 14, are applied on the one hand to the setting input of a flip-flop 15 and on the other hand, through a delay circuit 16 such as a coaxial line with distributed constants, to the resetting input of that flip-flop; the delay period of circuit 16 equals $T_0$ as defined above in connection with FIG. 1. The output of flip-flop 15 is averaged in an integrator 17 to produce the signal V.

Figure 5:
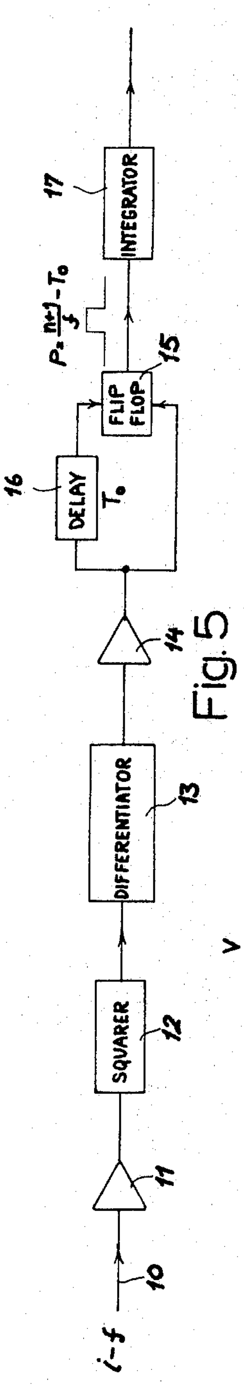
FIG. 5 is a diagram similar to FIG. 4, showing a modification.

The system of FIG. 5 is identical with that of FIG. 4 except that the delay circuit 16 has been transferred to the setting input of flip-flop 15. Thus, the circuit of FIG. 4 produces signal pulses $$P=T_0-\frac{n}{f}$$

whereas that of FIG. 5 gives rise to signal pulses $$P=\frac{n+1}{f}-T$$

It will thus be seen that we have devised a system which generates an output voltage proportional to the positive or negative increments in carrier frequency within an operating band $f_{min}$ to $f_{max}$, rather than to the absolute value of the frequency itself.

We claim:

1. A frequency discriminator for carrier waves variable in frequency between a minimum value $f_{min}$ and a maximum value $f_{max}$, comprising:

circuit means for generating a counting pulse in response to each cycle of an incoming carrier wave;

timing means responsive to said counting pulse for measuring a time interval $T_0$ satisfying the relationship $$\frac{n}{f_{min}}\leq T_0\leq\frac{n+1}{f_{max}}$$

where $n$ is an integer not exceeding the ratio $$f_{min}/(f_{max}-f_{min})$$

pulse-generating means responsive to said timing means and said circuit means for producing a train of rectangular pulses each bridging a variable period between the occurrence of a counting pulse and the end of a time interval $T_0$ initiated by a preceding counting pulse;

and integrating means connected to the output of said pulse-generating means for producing an output voltage proportional to increments in carrier frequency within the range between $f_{min}$ and $f_{max}$.

2. A frequency discriminator as defined in claim 1 wherein said pulse-generating means comprises a flip-flop with a setting input and a resetting input, one of said inputs being connected to said circuit means for receiving said counting pulses therefrom, the other of said inputs being connected to said timing means for receiving therefrom a signal marking the end of each time interval $T_0$.

3. A frequency discriminator as defined in claim 2 wherein said timing means comprises a delay circuit inserted between said circuit means and said other of said inputs.

4. A frequency discriminator as defined in claim 1 wherein said circuit means comprises a differentiation circuit.

5. A frequency discriminator as defined in claim 1 wherein $n$ is at least equal to unity.

6. A frequency discriminator as defined in claim 5 wherein said ratio is a whole number, $n$ being equal to said whole number.

7. A frequency discriminator as defined in claim 5 wherein said ratio is an improper fraction, $n$ being the nearest integer smaller than said fraction.

References Cited

UNITED STATES PATENTS 3,231,824 1/1966 Drapkin ------------ 328—109
3,271,689 9/1966 Hodder ---------- 329—126 X

OTHER REFERENCES

Morgan et al., "Delay Line Subcarrier Discriminator"—Electronics, March 1955, pp. 203–205.

ALFRED L. BRODY, Primary Examiner

U.S. Cl. X.R.

324—78; 325—325; 328—55, 109; 329—106